United States Patent
Aimura et al.

(10) Patent No.: US 9,067,537 B2
(45) Date of Patent: Jun. 30, 2015

(54) VEHICLE PERIPHERY MONITORING DEVICE

(75) Inventors: Makoto Aimura, Saitama (JP); Hideki Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 13/265,167

(22) PCT Filed: Jan. 28, 2010

(86) PCT No.: PCT/JP2010/051111
§ 371 (c)(1),
(2), (4) Date: Oct. 19, 2011

(87) PCT Pub. No.: WO2010/122828
PCT Pub. Date: Oct. 28, 2010

(65) Prior Publication Data
US 2012/0044352 A1    Feb. 23, 2012

(30) Foreign Application Priority Data
Apr. 23, 2009   (JP) .................................. 2009-105567

(51) Int. Cl.
*B60W 50/00*      (2006.01)
*B60R 1/00*       (2006.01)
*G08G 1/16*       (2006.01)

(52) U.S. Cl.
CPC ............. *B60R 1/00* (2013.01); *B60R 2300/106* (2013.01); *B60R 2300/307* (2013.01); *B60R 2300/8093* (2013.01); *G08G 1/166* (2013.01)

(58) Field of Classification Search
CPC .......... B60W 50/14; B60W 2050/146; B60W 2550/10
See application file for complete search history.

(56) References Cited

U.S. PATENT DOCUMENTS

| 6,327,536 | B1 | 12/2001 | Tsuji et al. |
| 6,693,524 | B1 * | 2/2004 | Payne ......................... 340/463 |
| 7,847,678 | B2 | 12/2010 | Kawamata et al. |
| 7,949,151 | B2 | 5/2011 | Taniguchi et al. |

(Continued)

FOREIGN PATENT DOCUMENTS

| CN | 101151171 A | 3/2008 |
| EP | 1 912 157 A1 | 4/2008 |

(Continued)

OTHER PUBLICATIONS

European Search Report issued Apr. 15, 2014 in the counterpart EP Patent Application 10766888.1.

(Continued)

*Primary Examiner* — Sath V Perungavoor
*Assistant Examiner* — Jeffery Williams
(74) *Attorney, Agent, or Firm* — Carrier Blackman & Associates, P.C.; Joseph P. Carrier; Jeffrey T. Gedeon

(57) ABSTRACT

Provided is a vehicle periphery monitoring device capable of making a driver reliably recognize the shape of an object to which attention should be paid. According to an image processing unit (1) (vehicle periphery monitoring device), for example, when it is highly probable that the shape of the object is difficult to be visually recognized through the output image because of the reason that the object is present far from the vehicle or other reason, an enlarged image (Q') of the object (Q) is displayed on an HUD (7) so as not to overlap with the object (Q).

12 Claims, 5 Drawing Sheets

(56) References Cited

U.S. PATENT DOCUMENTS

| | | | |
|---|---|---|---|
| 2002/0171542 A1* | 11/2002 | Bloomfield et al. | 340/464 |
| 2005/0276447 A1 | 12/2005 | Taniguchi et al. | |
| 2006/0043295 A1 | 3/2006 | Satou et al. | |
| 2006/0227214 A1 | 10/2006 | Fleury et al. | |
| 2012/0062743 A1* | 3/2012 | Lynam et al. | 348/148 |

FOREIGN PATENT DOCUMENTS

| | | | |
|---|---|---|---|
| JP | 2001-006096 A | | 1/2001 |
| JP | 2004-212658 A | | 7/2004 |
| JP | 2005-123968 A | | 5/2005 |
| JP | 2005123968 A | * | 5/2005 |
| JP | 2006-042147 A | | 2/2006 |
| JP | 2007-159036 A | | 6/2007 |
| JP | 2007-310705 A | | 11/2007 |
| JP | 2008-282067 A | | 11/2008 |

OTHER PUBLICATIONS

Office Action issued in the counterpart Chinese Patent Application 201080017912.X dated Dec. 9, 2014.

* cited by examiner

VEHICLE PERIPHERY MONITORING DEVICE

TECHNICAL FIELD

The present invention relates to a vehicle periphery monitoring device configured to monitor a periphery of a vehicle on the basis of an image of the periphery of the vehicle imaged by an imaging unit mounted in the vehicle.

BACKGROUND ART

When the presence of an object is recognized in a night vision image in front of a vehicle, an approach has been disclosed to magnify a display area of the night vision image so as to attract a driver's attention to the object (refer to Patent Document 1).

PRIOR ART REFERENCES

Patent Documents

Patent Document 1: Japanese Patent Laid-open No. 2007-159036

SUMMARY OF THE INVENTION

Problems to be Solved by the Invention

However, it may be difficult for the driver to clearly recognize the shape of the object merely by magnifying the display area of the night vision image. Thereby, it may be difficult for the driver to determine an appropriate driving method for the vehicle to avoid a contact between the vehicle and the object.

The present invention has been accomplished in view of the aforementioned problems, and it is therefore an object of the present invention to provide a vehicle periphery monitoring device capable of making a driver reliably recognize the shape of an object to which attention should be paid.

Means for Solving the Problems

To attain an object described above, the vehicle periphery monitoring device of the present invention comprises: a first image processing component configured to extract an image area corresponding to an object as an object area from an image of a periphery of a vehicle acquired by an imaging device mounted in the vehicle; and a second image processing component configured to display an output image representing the periphery of the vehicle in accordance with the image on an image display device mounted in the vehicle, wherein the second image processing component is configured to display an enlarged image of the object on the image display device in such a way that the enlarged image of the object overlaps with the output image but does not overlap with the object contained in the output image on the proviso that the object area is extracted by the first image processing component.

According to the vehicle periphery monitoring device of the present invention, the enlarged image of the object contained in the output image is displayed with an overlap with the output image. Further, the enlarged image of the object is displayed without being overlapped with the object contained in the output image. According to the visual recognition of the position and the size of the object by the driver through the output image, the general position of the object in real space can be recognized by the driver. Furthermore, even though it is difficult to visually recognize the shape of the object through the output image, the shape thereof can be reliably recognized by the driver visually through the enlarged image of the object. Since the enlarged image is displayed with an overlap with the output image, more information can be recognized by the driver through the image display device at one time.

It is acceptable that the second image processing component is configured to display on the image display device the enlarged image of the object on the proviso that the object satisfies a first condition containing at least one of the following aspects: a distance from the vehicle to the object is equal to or greater than a first reference distance, a size of the object in the image of the periphery of the vehicle or in the output image is smaller than a reference size, and a velocity of the vehicle is equal to or greater than a reference velocity.

According to the vehicle periphery monitoring device of the mentioned configuration, when it is highly probable that the shape of the object is difficult to be visually recognized through the output image due to the reason that the object is present far from the vehicle or the like, the enlarged image of the object is displayed.

It is acceptable that the second image processing component is configured to display on the image display device the enlarged image of the object in a predefined size.

According to the vehicle periphery monitoring device of the mentioned configuration, the occupied space of the enlarged image on the image display device is limited to a minimum size necessary for visually recognizing the shape of the object; thereby, it is expected to efficiently utilize the available image-displaying space on the image display device.

It is acceptable that the second image processing component is configured to display on the image display device a frame encircling the object in the output image, vary a size of the frame according to at least one of the following aspects: a distance from the vehicle to the object, a size of the object in the image of the periphery of the vehicle or in the output image, and a velocity of the vehicle, and display the frame of the varied size on the image display device.

According to the vehicle periphery monitoring device of the mentioned configuration, even in a situation when the object is present far from the vehicle or the like, the presence of the object may be emphasized by encircling the object with a frame having a size in accordance with the situation. Thereby, the position and the size of the object can be visually recognized by the driver with certainty through the output image, and consequently, the general position of the object in real space can be recognized by the driver.

It is acceptable that when a plurality of object areas have been extracted by the first image processing component, the second image processing component is configured to display on the image display device the enlarged image of an object on the proviso that the object among a plurality of objects corresponding to the plurality of object areas respectively satisfies a second condition containing at least one of the following aspects: a distance from the vehicle to the object is the shortest, and a contact possibility between the object and the vehicle is the highest.

According to the vehicle periphery monitoring device of the mentioned configuration, for an object having a high necessity for the vehicle to avoid a contact thereto, the enlarged image of the object is displayed by priority. Thereby, the shape of the object having a high necessity for the vehicle to avoid a contact thereto is visually recognized by the driver with certainty, and the recognition result is useful for the driver to determine an appropriate driving method for the vehicle so as to avoid a contact between the vehicle and the object.

It is acceptable that the second image processing component is configured to locate the enlarged image of the object in one image area where the object is present among a plurality of image areas constituting the output image and display the same on the image display device.

According to the vehicle periphery monitoring device of the mentioned configuration, the position of the object and the position of the enlarged image of the object in the output image are located close to each other. Thereby, the attention of the driver toward the image display device will not be distracted between the object and the enlarged image thereof in the output image, and consequently, the general position of the object in real space and the shape of the object can be recognized easily by the driver.

It is acceptable that the second image processing component is configured to locate the enlarged image of the object at a position opposite to a displacement direction of the object viewed from the object in the output image and display the same on the image display device.

According to the vehicle periphery monitoring device of the mentioned configuration, since the enlarged image of the object is prevented from being displaced in follow of the displacement of the object in the output image to overlap with the object, it is easy for the driver to visually recognize the shape of the object through the enlarged image.

It is acceptable that the second image processing component is configured to pause or reserve the enlarged image of the object on the image display device when a distance from the vehicle to the object is equal to or shorter than a second reference distance, or a time interval from a present time to another time where the distance from the vehicle to the object is predicted to be the shortest is equal to or smaller than a reference time interval.

According to the vehicle periphery monitoring device having the mentioned configuration, in view of the distance between the vehicle and the object, when it is highly probable or necessary for the driver to visually recognize the object through the window shield, the attention of the driver is prevented from being distracted by the enlarged image of the object displayed on the image display device.

MODE FOR CARRYING OUT THE INVENTION

An embodiment of a vehicle periphery monitoring device according to the present invention will be described hereinafter.

First, the configuration of the vehicle periphery monitoring device of the present embodiment will be described.

Figure 1:
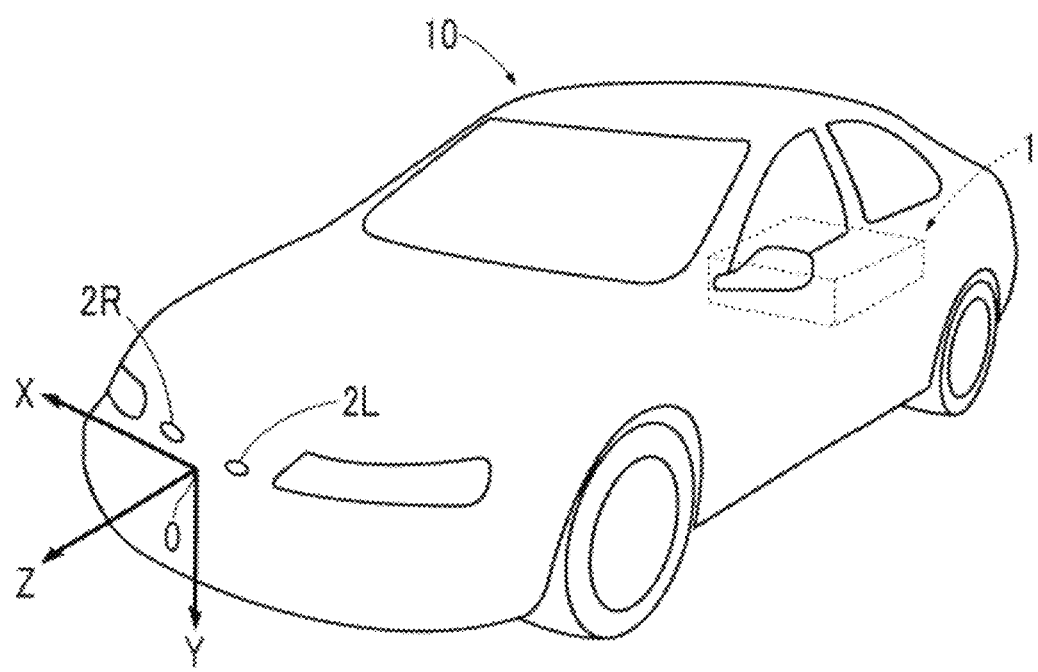
FIG. 1 is a diagram illustrating a mounting behavior of an imaging device and a vehicle periphery monitoring device to a vehicle.
Figure 2:
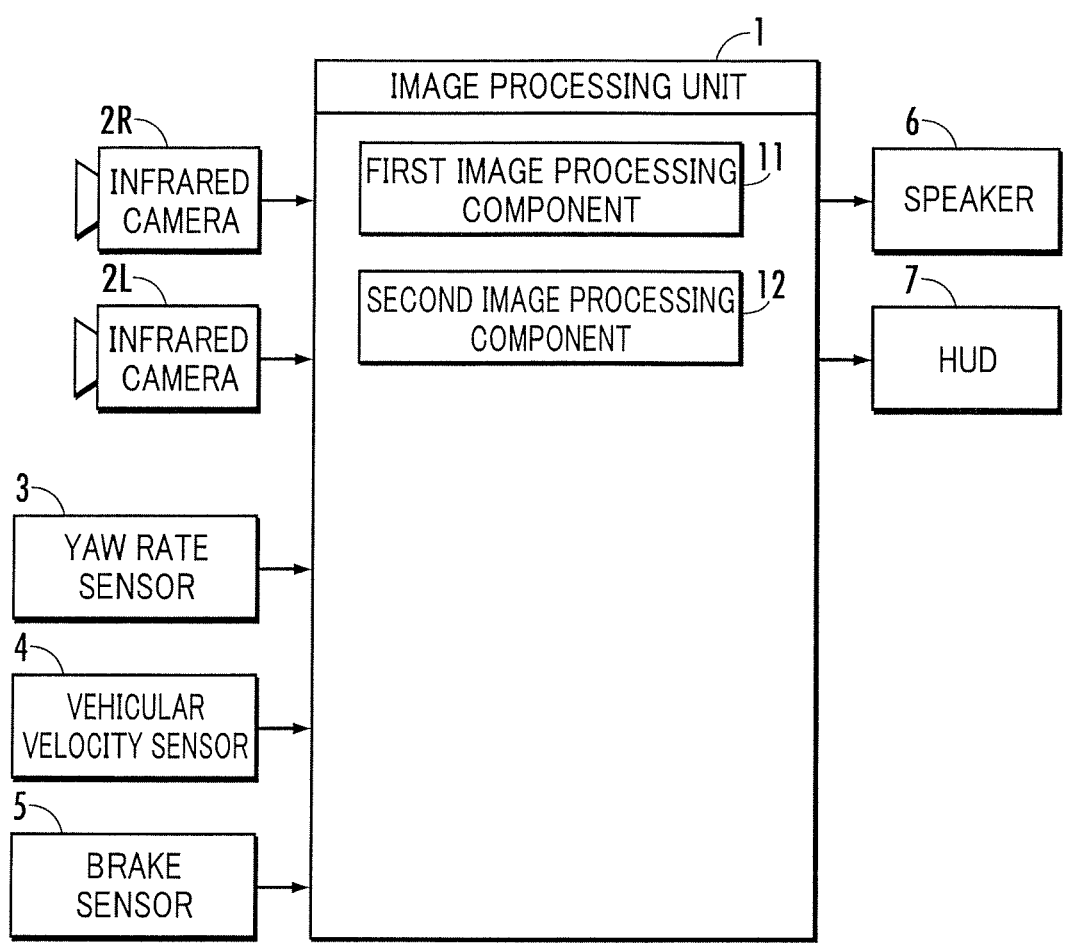
FIG. 2 is a diagram illustrating a configuration of the vehicle periphery monitoring device.

As illustrated in FIG. 1, the vehicle periphery monitoring device is composed of an image processing unit 1 mounted in a vehicle 10. As illustrated in FIG. 2, the image processing unit 1 is connected with a pair of infrared cameras (corresponding to imaging devices of the present invention) 2R and 2L disposed laterally for capturing an image in front of the vehicle 10, a yaw rate sensor 3 for detecting a yaw rate of the vehicle 10, a vehicular velocity sensor 4 for detecting a traveling velocity (vehicular velocity) of the vehicle 10, and a brake sensor 5 for detecting a braking operation of the vehicle 10.

The image processing unit 1 is further connected with a speaker 6 for outputting auditory notification information through audible voices or the like and an HUD 7 (image display device) disposed nearby the front window for displaying a captured image by the infrared cameras 2R and 2L or visual notification information. In place of or in addition to the HUD, it is also acceptable to use a display panel for displaying the travelling state such as the vehicular velocity and the like of the vehicle 10 or an image displayer which is a component in a navigation device mounted in the vehicle 10 as the image display device.

The image processing unit 1 is composed of an ECU (electronic control unit) having an A/D conversion circuit, a CPU, memories such as a RAM, a ROM and the like, and an I/O circuit connected by buses or the like.

The image processing unit 1 is provided with a first image processing component 11 and a second image processing component 12, of is composed of a memory and a CPU configured to retrieve one or both of a program and data stored in the memory and perform an arithmetic processing according to the retrieved program or the like. Each of the first image processing component 11 and the second image processing component 12 may be constructed from one or plural number of hardware (one or plural number of processors or arithmetic processing circuits). The first image processing component 11 and the second image processing component 12 may be constructed to share at least a part of hardware in common or may be constructed from separate hardware.

It should be noted the description that a hardware (a processor or the like) which is a component of a system is configured to perform an arithmetic processing means that the component is programmed to perform the arithmetic processing, or perform the arithmetic processing by retrieving a program appropriately from a memory and performing the retrieved program.

Analog signals output from the infrared cameras 2R and 2L, the yaw rate sensor 3, the vehicular velocity sensor 4 and the brake sensor 5 are converted into digital data via the A/D conversion circuit; on the basis of the digital data, the CPU detects an object such as a human being (a pedestrian or an occupant of a bicycle or a two-wheeled vehicle), a quadruped animal (a dog, a horse, a deer or the like), an artificial structure (a wall, a building or the like) or the like, and notifies a driver of the vehicle 10 the presence of the object or the level of contact possibility between the vehicle 10 and the object via the speaker 6 or the HUD 7 when the detected object satisfies a predefined notification requirement.

As illustrated in FIG. 2, in order to photograph an image in front of the vehicle 10, the infrared cameras 2R and 2L are disposed at a front portion (at the front grill in the drawing) of the vehicle 10. The right infrared camera 2R and the left infrared camera 2L are disposed closer to the right side and closer to the left side rather than to the center point in the width direction of the vehicle 10, respectively. The infrared cameras 2R and 2L are disposed symmetrical with respect to the central line in the width direction of the vehicle 10. The infrared cameras 2R and 2L are fixed in such a way that the optical axes thereof are parallel to each other in the anteroposterior direction of the vehicle 10 and the vertical dimension from the road surface to the optical axis of one camera is equal to the other. The infrared cameras 2R and 2L have sensitivity in the far infrared region, therefore, have a property of outputting image signals with higher levels (the luminance of the image signals becomes greater) when the temperature of an object to be imaged becomes higher.

However, if the distance to the object is measured by radar, it is acceptable to mount one infrared camera only in the vehicle 10.

Hereinafter, the functions of the vehicle periphery monitoring device with the aforementioned configurations will be described. Since the image processing has been disclosed in detail in Japanese Patent Laid-open No. 2001-006096, Japanese Patent Laid-open No. 2007-310705 and the like, the description thereof will be given here briefly.

The following series of processes are performed by the first image processing component 11.

Figure 3:
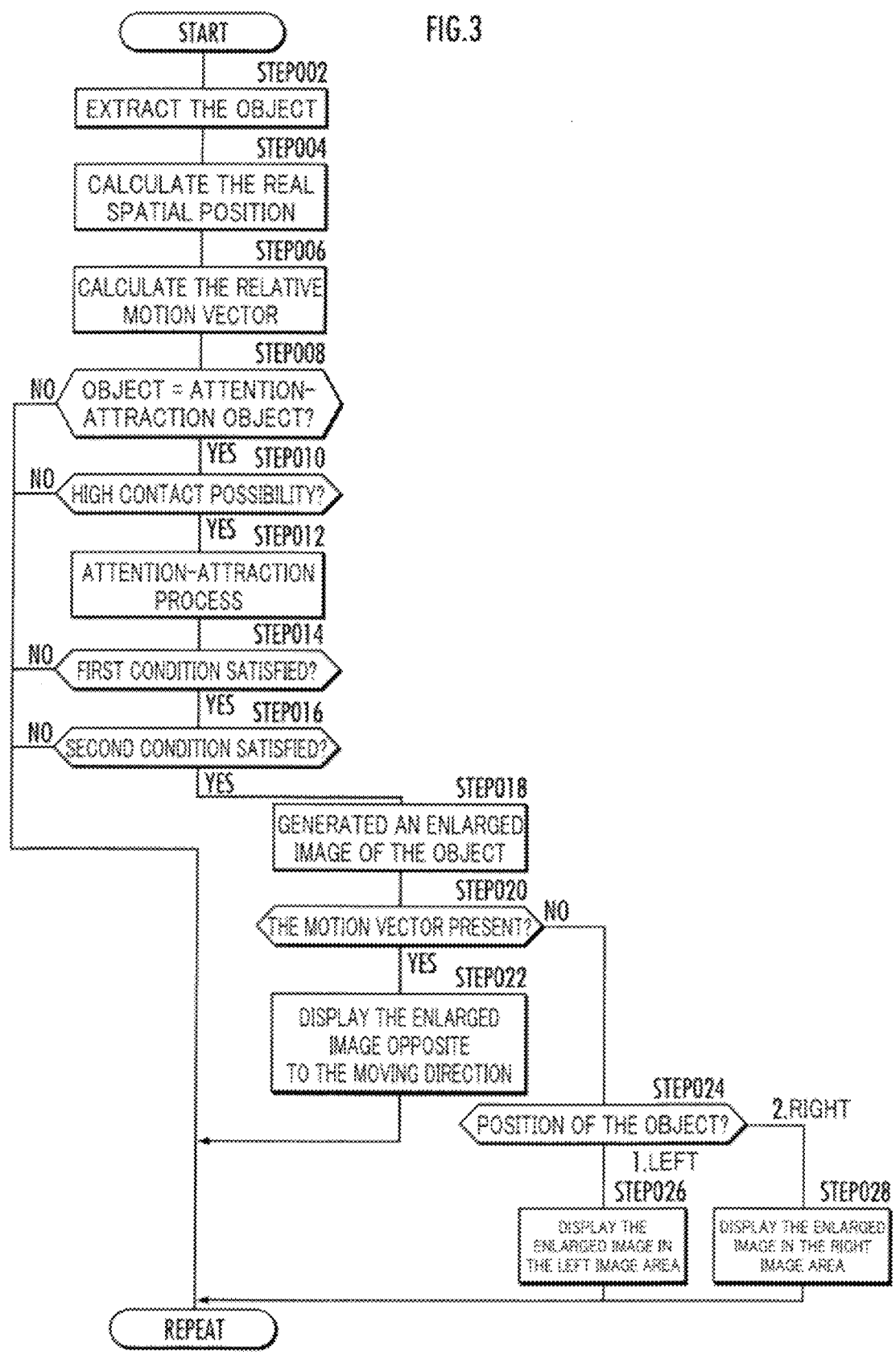
FIG. 3 is a flow chart illustrating overall functions of the vehicle periphery monitoring device.

Firstly, an object extraction process is performed (FIG. 3/STEP 002). Specifically, infrared image signals input into the image processing unit 1 from the infrared cameras 2R and 2L are subjected to A/D conversion, and on the basis of the A/D converted infrared image signals, a gray scale image is generated. Subsequently, a gray scale image (right image) which serves as a reference image is binarized. Thereafter, in the binarized image, an area where the object is present is extracted as an object area.

Specifically, the group of pixels constituting a high luminance area in the binarized image is converted to run length data, line groups overlapped in the vertical direction of the reference image are tagged with a label (identifier), respectively, and each of the line groups are extracted as the object area. Thereby, as illustrated in FIG. 4(a), the high luminance area constituted by the grouped high luminance pixels (pixel value=1 pixel) is extracted as the object area Q.

Thereafter, the position of the center of gravity (position in the reference image) of each object, the superficial area thereof and the aspect ratio of a circumscribed quadrangle circumscribing each object are calculated. A time interval tracking is performed on the object to determine whether or not the object is identical for every arithmetic computation cycle of the image processing unit 1. The outputs from the vehicular velocity sensor 4 and the yaw rate sensor 5 (the detection value of the vehicular velocity and the detection value of the yaw rate) are retrieved. In parallel to the calculation of the aspect ratio of the circumscribed quadrangle and the time interval tracking of the object, an area corresponding to each object (for example, the area of the circumscribed quadrangle of the object) is extracted as a searching image from the reference image.

An image (a corresponding image) corresponding to the searching image is searched and extracted from the left image according to a correlation computation. Thereafter, a real spatial distance (in the anteroposterior direction of the vehicle 10) z from the vehicle 10 to the object is calculated. Then, the real spatial position (relative position with respect to the vehicle 10) of each object is calculated FIG. 3/STEP 004). Thereafter, the X component in the real spatial position (X, Y, Z) of the object (refer to FIG. 1) is corrected according to the turning angle data in time series. Subsequently, a relative motion vector of the object with respect to the vehicle 10 is calculated (FIG. 3/STEP 006).

The following series of processes are performed by the second image processing component 12.

Firstly, whether the object is an attention-attraction object such as (1) a human being (a pedestrian, an occupant of a bicycle or the like), a quadruped animal (a dog, a horse, a deer or the like) or the like, or is an non-attention-attraction object such as (2) an artificial structure (a wall, a pole, a vending machine or the like) or the like is determined (FIG. 3/STEP 008). For example, the type of the object is determined according to the characteristics such as the shape or size, the luminance distribution and the like of the object area Q (refer to FIG. 4(a)) in the gray scale image.

If the object is determined to be the attention-attraction object (FIG. 3/STEP 008 . . . YES), the level of contact possibility between the vehicle and the object is determined (FIG. 3/STEP 010).

Since the determination approach has been disclosed in Japanese Patent Laid-open No. 2001-006096 and Japanese Patent Laid-open No. 2007-310705, the description thereof will be given here briefly. First, whether the real spatial distance z to the object is equal to or smaller than a multiplication product of a relative velocity Vs and a time interval T is determined. If the real spatial distance z is determined to be equal to or smaller than the multiplication product, whether or not the object is present in a contiguity determination area is determined (first contact determination process). The contiguity determination area extends ahead of the vehicle 10, symmetrically in the lateral direction of the vehicle 10, and has a width with an offset added to the vehicle width of the vehicle 10. If the determination result in the first contact determination process is affirmative, it is determined that the object has a high possibility to contact the vehicle 10. On the other hand, if the determination result in the first contact determination process is negative, whether or not the object is present in an entry determination area located outside the contiguity determination area and whether or not the relative motion vector of the object is pointing toward the contiguity determination area is further determined (second contact determination process). If the determination result in the second contact determination process is affirmative, it is determined that the object has a high possibility to contact the vehicle 10.

If it is determined that the contact possibility between the vehicle 10 and the object is high (the determination result in the first or the second contact determination process is affirmative) (FIG. 3/STEP 010 . . . YES), an attention-attraction process is performed (FIG. 3/STEP 012). Thereby, as illustrated in FIG. 4(a), a rectangular frame F1 encircling the object Q is displayed on the HUD 7. In place of or in addition to displaying the frame F1, it is also acceptable to output audible sounds such as "peep, peep, peep . . . " from the speaker 6 to attract the driver's attention to the object.

If it is determined that the object is not an attention-attraction object (FIG. 3/STEP 008 . . . NO) or the contact possibility between the vehicle 10 and the object is low (FIG. 3/STEP 010 . . . NO), the processes from the object extraction process and thereafter are repeated except the attention-attraction process (refer to FIG. 3/STEP 002 and thereafter).

Subsequently, whether or not the object satisfies a first condition is determined (FIG. 3/STEP 014). At least one of the following aspects is adopted as the first condition: (1) the real spatial distance z to the object Q is equal to or greater than a first reference distance; (2) the size of the object in the captured image (the gray scale image) by the infrared cameras 2R and 2L or in the output image (the image displayed on the HUD 7) is smaller than a reference size; and (3) the vehicular velocity of the vehicle 10 is equal to or greater than a reference velocity.

If it is determined that the object satisfies the first condition (FIG. 3/STEP 014 . . . YES), whether or not the object satisfies a second condition is determined (FIG. 3/STEP 016). The sufficiency determination of the second condition may be performed only when a plurality of object areas are extracted by the first image processing component 11. When the real spatial distance z to an object among a plurality of objects corresponding to the plurality of object areas respectively is the shortest, it is adopted as the second condition.

Moreover, in place of or in addition to the shortest real spatial distance z, it is also acceptable to adopt as the second condition when the contact possibility between an object among the plurality of objects and the vehicle 10 is the highest. For example, when the distance from one object among the plurality of objects to the vehicle 10 predicted according to the relative motion vector (refer to FIG. 3/STEP 006) becomes zero at the earliest time or no more than a threshold is determined to have the highest contact possibility to the vehicle 10.

If it is determined that the object satisfies not only the first condition but also the second condition (FIG. 3/STEP 016 . . . YES), an enlarged image of the object is generated (FIG. 3/STEP 018). Thereby, as illustrated in FIG. 4(b), an enlarged image Q' encircled by a rectangular frame F2 is generated having the image area containing the object Q encircled by the frame F1 extended in the lateral direction and the vertical direction, respectively. The aspect ratio of the enlarged image may be identical to or different from the aspect ratio of the original image area. The size of the enlarged image of the object on the HUD 7 may be adjusted to a predefined size.

It is acceptable to display the enlarged image Q' at any position on the HUD 7 on the proviso that the enlarge image Q' does not overlap with the object Q; however, in the present embodiment, as to be described hereinafter, the position of the enlarged image Q' is adjusted according to the displacement direction and the position of the object Q in the output image.

Subsequently, whether or not a lateral component surpassing a predefined velocity (may be zero) is contained in the motion vector of the object in the output image is determined (FIG. 3/STEP 020).

If the determination result is affirmative (FIG. 3/STEP 020 . . . YES), the enlarged image Q' of the object is located at a position opposite to the moving direction of the object Q viewed from the object Q in the output image and display it on the HUD 7 (FIG. 3/STEP 022). Thereby, for example as illustrated in FIG. 5(a) by the arrow, when the object Q in the output image displaces to the right side as time passes, the enlarged image Q' thereof is displayed on the HUD 7, positioned at the left side of the object Q so as not to overlap with the object Q.

On the other hand, if the determination result is negative (in other words, the object hardly displaces in the lateral direction) (FIG. 3/STEP 020 . . . NO), whether or not the position (the position of the center of gravity) of the object Q is contained in either of plural image areas constituting the output image is determined (FIG. 3/STEP 024).

Specifically, as illustrated in FIG. 5(b) and FIG. 5(c), whether the position of the object is contained either in the left image area or in the right image area which are divided by a dashed line is determined. The dashed line may be positioned at the center of the output image or may be deviated laterally from the center of the output image in relation to the yaw rate. It is also acceptable that the output image is divided into 3 or more image areas in the lateral direction and the position of the enlarged image Q' of the object Q is adjusted according to the position of the object Q in either one of the plural image areas.

If it is determined that the position of the object Q is in the left image area (FIG. 3/STEP 024 . . . 1), the enlarged image Q' of the object is displayed on the HUD 7, positioned at the left image area without overlapping with the object Q (refer to FIG. 3/STEP 026 and FIG. 5(b)). If it is determined that the position of the object Q is in the right image area (FIG. 3/STEP 024 . . . 2), the enlarged image Q' of the object is displayed on the HUD 7, positioned at the right image area without overlapping with the object Q (refer to FIG. 3/STEP 028 and FIG. 5(c)).

According to the image processing unit 1 (the vehicle periphery monitoring device) with the functions mentioned above, the enlarged image Q' of the object Q is overlapped and displayed in the output image (refer to FIG. 4(a) and FIG. 4(b)). Particularly, when the object Q satisfies the first condition, in other words, when the shape of the object is difficult to be visually recognized through the output image due to the reason that the object Q is present far from the vehicle 10 or the like, the enlarged image Q' of the object Q is overlapped and displayed in the output image (refer to FIG. 3/STEP 014 and FIG. 5(a) to FIG. 5(c)).

Further, the enlarged image Q' of the object Q is displayed without overlapping with the object Q contained in the output image. According to the visual recognition of the position and the size of the object Q by the driver through the output image, the general position of the object Q in real space can be recognized by the driver.

Furthermore, even though it is difficult to visually recognize the shape of the object Q through the output image, the shape thereof can be reliably recognized by the driver visually through the enlarged image Q' of the object (refer to FIG. 4(a) and FIG. 4(b)). Since the enlarged image Q' is displayed with an overlap with the output image, more information can be recognized by the driver through the HUD 7 at one time.

When a plurality of objects are extracted, the enlarged image of an object among the plurality of objects satisfying the second condition, namely an object having a high necessity for the vehicle 10 to avoid a contact thereto is displayed (refer to FIG. 3/STEP 016, FIG. 5(a) to FIG. 5(c)).

According thereto, the shape of the object Q having a high necessity for the vehicle 10 to avoid a contact thereto is visually recognized by the driver with certainty, and the recognition result is useful for the driver to determine an appropriate driving method (steering operation by priority or deceleration operation by priority) for the vehicle 10 so as to avoid a contact between the vehicle 10 and the object Q.

The enlarged image Q' of the object Q is displayed at a predefined size on the HUD 7 (refer to FIG. 5(a) to FIG. 5(c)). According thereto, the occupied space of the enlarged image on the HUD 7 is limited to a minimum size necessary for visually recognizing the shape of the object; and thereby, it is expected to efficiently utilize the available image display space on the HUD 7.

In the left image area and the right image area constituting the output image, the enlarged image Q' of the image is positioned at one of the image areas where the object Q is present and is displayed on the HUD 7 (refer to FIG. 3/STEP 024, 026 and 028, FIG. 5(b) and FIG. 5(c)). According thereto, the position of the object Q and the position of the enlarged image Q' of the object in the output image are located close to each other. Thereby, the attention of the driver toward the HUD 7 will not be distracted from the object Q and the enlarged image Q' thereof in the output image, and consequently, the general position of the object Q in real space and the shape of the object Q can be recognized easily by the driver.

Figure 5:
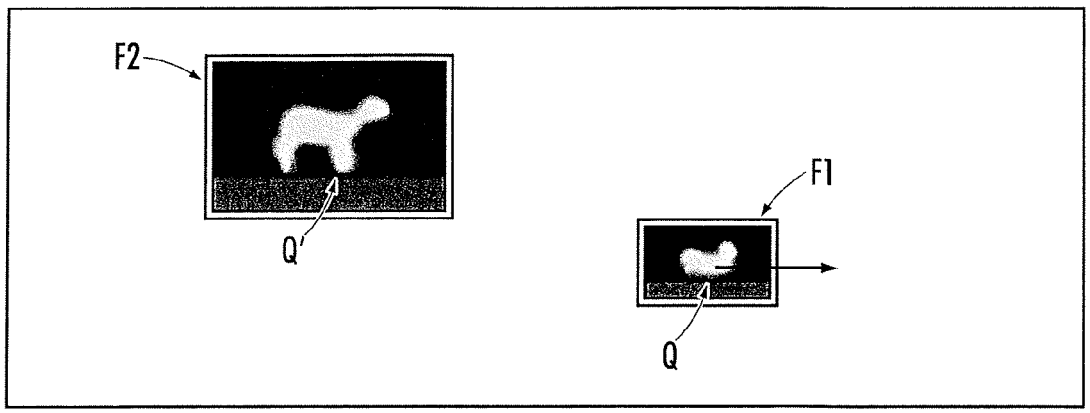
FIG. 5 is an explanatory diagram related to display modes of enlarged images of objects.
Figure 5:
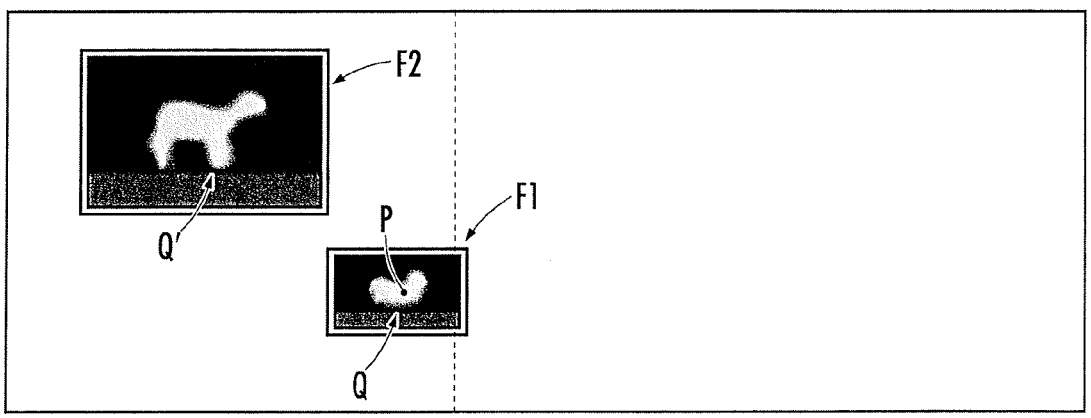
Figure 5:
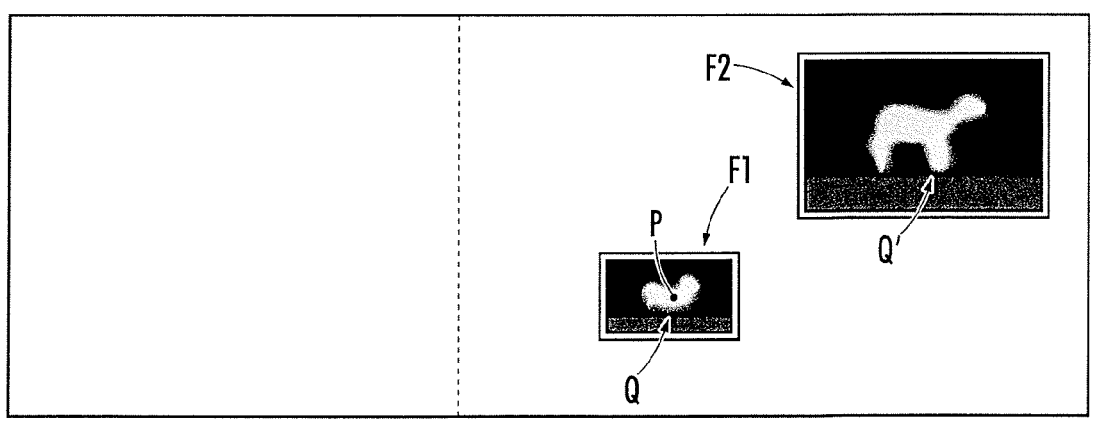

The enlarged image Q' of the object is located at a position opposite to the displacement direction of the object Q viewed from the object Q in the output image and displayed on the HUD 7 (refer to FIG. 3/STEP 020 and 022, FIG. 5(*a*)). According thereto, since the enlarged image Q' of the object is prevented from being displaced in follow of the displacement of the object Q in the output image to overlap with the object Q, it is easy for the driver to visually recognize the shape of the object Q through the enlarged image Q'.

Figure 4:
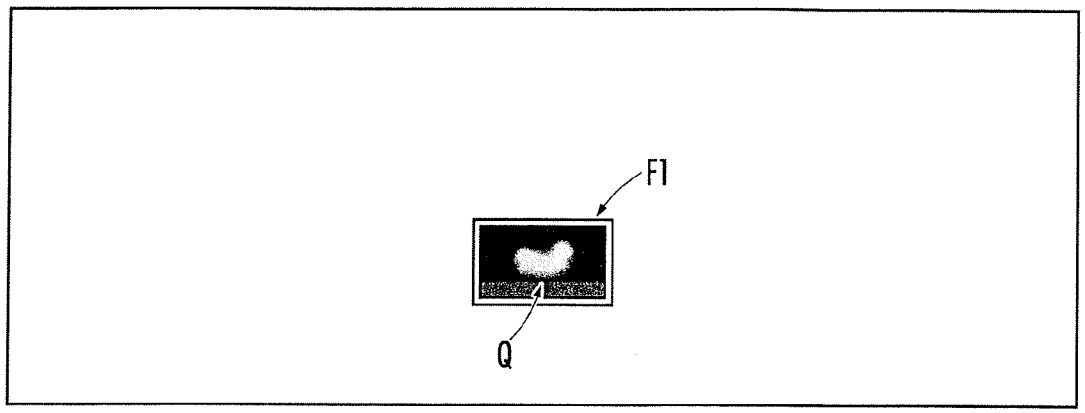
FIG. 4 is an explanatory diagram related to an attention-attraction process and a generation method of an enlarged image.
Figure 4:
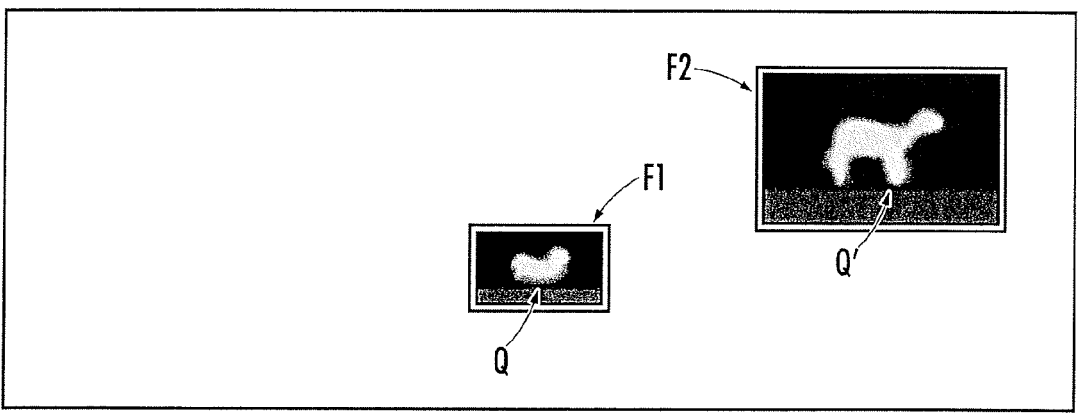

It is acceptable that the second image processing component 12 is configured to vary the size of the frame F1 according to at least one of the real spatial distance z to the object, the size of the object in the image of the periphery of the vehicle 10 or in the output image, and the vehicular velocity of the vehicle 10 and display it (refer to FIG. 4).

According to the vehicle periphery monitoring device of the mentioned configuration, even in a situation when the object Q is present far from the vehicle 10 or the like, the presence of the object Q may be emphasized by encircling the object Q with the frame F1 having a size in accordance with the situation. Thereby, the position and the size of the object Q can be visually recognized by the driver with certainty through the output image, and consequently, the general position of the object Q in real space can be recognized by the driver.

It is acceptable that the second image processing component 12 is configured to pause or reserve the enlarged image Q' of the object on the HUD 7 when the real spatial distance to the object is equal to or shorter than the second reference distance (set equal to or shorter than the first reference distance, for example), or a time interval from a present time to another time where the distance from the vehicle 10 to the object is predicted to be the shortest is equal to or smaller than the reference time interval.

According to the vehicle periphery monitoring device of the mentioned configuration, in view of the distance between the vehicle 10 and the object Q, when it is highly probable or necessary for the driver to recognize the object visually through the window shield, the attention of the driver is prevented from being distracted by the object Q and the enlarged image Q' thereof displayed on the HUD 7.

What is claimed is:

1. A vehicle periphery monitoring device comprising:
a first image processing component configured to extract an image area corresponding to an object as an object area from an image of a periphery of a vehicle acquired by an imaging device mounted in the vehicle; and
a second image processing component configured to display an output image representing the periphery of the vehicle in accordance with the image on an image display device mounted in the vehicle,
wherein the second image processing component is further configured to determine whether or not the object satisfies a first condition and to display an enlarged image of the object on the image display device if it is determined that the object satisfies a first condition,
wherein the object is displayed on the image display device in such a way that the enlarged image of the object overlaps with the output image but does not overlap with the object contained in the output image on the proviso that the object area is extracted by the first image processing component, and
wherein the first condition includes at least that a size of the object in the image of the periphery of the vehicle or in the output image is smaller than a reference size.

2. The vehicle periphery monitoring device according to claim 1, wherein the second image processing component is configured to display on the image display device the enlarged image of the object in a predefined size.

3. The vehicle periphery monitoring device according to claim 2, wherein the second image processing component is configured to display on the image display device a frame encircling the object in the output image, vary a size of the frame according to at least one of the following aspects: a distance from the vehicle to the object, a size of the object in the image of the periphery of the vehicle or in the output image, and a velocity of the vehicle, and display the frame of the varied size on the image display device.

4. The vehicle periphery monitoring device according to claim 1, wherein the second image processing component is configured to locate the enlarged image of the object in one image area where the object is present among a plurality of image areas constituting the output image and display the same on the image display device.

5. The vehicle periphery monitoring device according to claim 1, wherein the second image processing component is configured to locate the enlarged image of the object at a position opposite to a displacement direction of the object viewed from the object in the output image and display the same on the image display device.

6. The vehicle periphery monitoring device according to claim 1, wherein the display of the enlarged image of the object is paused or reserved on the image display device when a distance from the vehicle to the object is equal to or shorter than a second reference distance, or a time interval from a present time to another time where a distance from the vehicle to the object is predicted to be the shortest is equal to or smaller than a reference time interval.

7. A vehicle periphery monitoring device comprising:
a first image processing component configured to extract an image area corresponding to an object as an object area from an image of a periphery of a vehicle acquired by an imaging device mounted in the vehicle; and
a second image processing component configured to display an output image representing the periphery of the vehicle in accordance with the image on an image display device mounted in the vehicle,
wherein the second image processing component is further configured to determine whether or not the object satisfies a first condition and to display an enlarged image of the object on the image display device if it is determined that the object satisfies a first condition, and wherein the second image processing component displays the enlarged image in such a way that the enlarged image of the object overlaps with the output image but does not overlap with the object contained in the output image if the object area is extracted by the first image processing component,
when a plurality of object areas have been extracted by the first image processing component, the second image processing component is configured to display on the image display device the enlarged image of an object if the object among a plurality of objects corresponding to the plurality of object areas respectively satisfies a second condition containing a contact possibility between the object and the vehicle is the highest, the contact possibility is evaluated based on a relative motion vector of the object with respect to the vehicle, and wherein the first condition includes at least that a size of the object in the image of the periphery of the vehicle or in the output image is smaller than a reference size.

8. The vehicle periphery monitoring device according to claim 7, wherein the second image processing component is configured to display on the image display device the enlarged image of the object in a predefined size.

9. The vehicle periphery monitoring device according to claim 8, wherein the second image processing component is configured to display on the image display device a frame encircling the object in the output image, vary a size of the frame according to at least one of the following aspects: a distance from the vehicle to the object, a size of the object in the image of the periphery of the vehicle or in the output image, and a velocity of the vehicle, and display the frame of the varied size on the image display device.

10. The vehicle periphery monitoring device according to claim 7, wherein the second image processing component is configured to locate the enlarged image of the object in one image area where the object is present among a plurality of image areas constituting the output image and display the same on the image display device.

11. The vehicle periphery monitoring device according to claim 7, wherein the second image processing component is configured to locate the enlarged image of the object at a position opposite to a displacement direction of the object viewed from the object in the output image and display the same on the image display device.

12. The vehicle periphery monitoring device according to claim 7, wherein the display of the enlarged image of the object is paused or reserved on the image display device when a distance from the vehicle to the object is equal to or shorter than a second reference distance, or a time interval from a present time to another time where a distance from the vehicle to the object is predicted to be the shortest is equal to or smaller than a reference time interval.

* * * * *